US012783651B2

(12) United States Patent
Kim

(10) Patent No.: US 12,783,651 B2
(45) Date of Patent: Nov. 3, 2026

(54) APPARATUS AND METHOD FOR PROTECTING MEMORY

(71) Applicant: SAMSUNG SDI CO., LTD., Yongin-si (KR)

(72) Inventor: Min Su Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 18 days.

(21) Appl. No.: 18/786,705

(22) Filed: Jul. 29, 2024

(65) Prior Publication Data

US 2025/0077664 A1 Mar. 6, 2025

(30) Foreign Application Priority Data

Aug. 31, 2023 (KR) ........................ 10-2023-0115261

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS 6,892,305 B1 * 5/2005 Dayan ................... G06F 21/575 713/192
10,726,163 B2 * 7/2020 Harrison ............... G06F 21/554
11,403,235 B2 8/2022 Kim et al.
2014/0016426 A1 * 1/2014 Hyde ...................... G06F 21/00 365/228
2016/0239663 A1 * 8/2016 Healy .................... G06F 11/076
2017/0286680 A1 * 10/2017 Benoit .................. G06F 21/554
2018/0089425 A1 * 3/2018 Trikalinou .............. G06F 21/70
2021/0311823 A1 10/2021 Schat
2023/0205874 A1 * 6/2023 Boehm ................. G06F 21/554 726/23
2023/0283891 A1 * 9/2023 Vacquerie ............. G06F 1/1626 348/372

FOREIGN PATENT DOCUMENTS

KR 10-2021-0081009 A 7/2021

OTHER PUBLICATIONS

Extended European Search Report issued on Dec. 9, 2024 in the corresponding European Patent Application No. 24191306.0.

* cited by examiner

*Primary Examiner* — Linglan Edwards
*Assistant Examiner* — Kamryn J Gillespie
(74) *Attorney, Agent, or Firm* — Lee IP Law, P.C.

(57) ABSTRACT

Embodiments relate to an apparatus and method for protecting a memory. The apparatus may include a monitoring unit configured to monitor pieces of status data of an integrated circuit (IC) chip, and a processor configured to analyze the pieces of status data monitored by the monitoring unit to detect a cold boot attack on the IC chip and protect a memory in the IC chip from the cold boot attack according to a detection result.

14 Claims, 6 Drawing Sheets

FIG.3

Power, Current, Voltage Raw Data

Data Example (Time Series)

```
power_consumption = [0.45, 0.47, 0.46, 0.44, 0.47, ...]
current_consumption = [2.5, 2.7, 2.6, 2.5, 2.8, ...]
voltage_changes = [1.1, 1.2, 1.15, 1.1, 1.15, ...]
timing_errors = [None, 'type1', None, None, 'type2', ...]
physical_damages = [None, None, 'location1', None, 'location2', ...]
data_errors = [None, None, 'type1', None, None, ...]
```

Data Explanation

- power_consumption = POWER CONSUMPTION
- current_consumption = CURRENT CONSUMPTION
- voltage_changes = VOLTAGE CHANGES
- timing_errors = TIMING ERROR
- physical_damages = PHYSICAL DAMAGE
- data_errors = DATA ERROR Data Example (Time Quantum)

```
data_point = {
    'power': 0.45,
    'current': 2.5,
    'voltage': 1.1,
    'timing_error': None,
    'physical_damage': None,
    'data_error': None,
}
```

FIG.4

CBA Diagnostic Event

Data Example & Explanation (NVmemory Logging)

| | |
|---|---|
| diagnostic_output = { | |
| 'time_detected': '2023-07-18 14:35:27', | TIME AT WHICH PROBLEM HAS BEEN DETECTED |
| 'problem_type': 'Cold Boot Attack', | TYPE OF DETECTED PROBLEM |
| 'severity': 'High', | SEVERITY OF PROBLEM |
| 'additional_info': { | ADDITIONAL INFORMATION |
| 'power_pattern': 'Unexpected spike', | POWER PATTERN |
| 'current_pattern': 'Unexpected spike', | CURRENT PATTERN |
| 'voltage_pattern': 'Unstable fluctuation', | VOLTAGE PATTERN |
| 'timing_error_detected': True, | WHETHER TIMING ERROR HAS BEEN DETECTED |
| 'physical_damage_detected': False, | WHETHER PHYSICAL DAMAGE HAS BEEN DETECTED |
| 'data_error_detected': False, | WHETHER DATA ERROR HAS BEEN DETECTED |
| }, | |
| } | |

Data Example & Explanation (CPU Special Register)

APPARATUS AND METHOD FOR PROTECTING MEMORY

CROSS-REFERENCE TO RELATED APPLICATION

This application claims priority to and the benefit of Korean Patent Application No. 10-2023-0115261, filed on Aug. 31, 2023, the disclosure of which is incorporated herein by reference in its entirety.

BACKGROUND

1. Field

Embodiments of the present disclosure relate to an apparatus and method of protecting a memory.

2. Description of the Related Art

Cold boot attacks are one method of maliciously extracting information. Cold boot attacks cool a memory chip to freeze data, make the data temporarily maintained even after a system is shut down, and then read the data. Cold boot attacks require very complex and specialized skills, but are a threat that may be realized by attackers who have sufficient resources and expert knowledge.

A way to defend against cold boot attacks is to encrypt a memory to make data unreadable by attackers. However, such a solution places a burden on system performance, and an encryption key itself may be vulnerable to attacks. In particular, real-time memory encryption may be burdensome in a battery management system (BMS) belonging to an embedded system that is sensitive to a central processing unit (CPU) load rate.

Another way to defend against cold boot attacks is to clear a memory when a system shuts down in order to erase data stored in a memory as soon as a system is shut down, making the data unreadable by attackers. However, such a solution may not be effective when a system is shut down unexpectedly.

Embodiments include an apparatus for protecting a memory. The apparatus comprises a monitoring unit configured to monitor pieces of status data of an integrated circuit (IC) chip, and a processor configured to analyze the status data monitored by the monitoring unit to detect a cold boot attack on the IC chip and protect a memory in the IC chip from the cold boot attack according to a detection result.

In one or more embodiments, the monitoring unit may monitor at least one of power consumption, current consumption, voltage changes, and system performance changes of the IC chip.

The processor, in embodiments, may compare each pattern of the status data with a setting pattern set for each pattern to extract similarity and may detect the cold boot attack according to the similarity.

If the similarity of at least one of the pieces of status data is greater than or equal to a preset reference value, the processor may determine that the cold boot attack has been made.

The processor may compare the status data with a critical range preset for each piece of status data to detect the cold boot attack according to a comparison result.

If at least one of the pieces of status data is out of the critical range, the processor may determine that the cold boot attack has been made.

If the cold boot attack is detected, the processor may increase a temperature of the IC chip.

In an example embodiment, the processor may overclock the IC chip to increase the temperature thereof.

If the cold boot attack is detected, the processor may protect data of the memory in the IC chip.

In one or more embodiments, the processor may replace the data of the memory in the IC chip with null data to protect the data of the memory in the IC chip.

Embodiments include a method of protecting a memory. The method may include monitoring, by a monitoring unit, pieces of status data of an integrated circuit (IC) chip, analyzing, by a processor, the pieces of status data monitored by the monitoring unit to detect a cold boot attack on the IC chip, and protecting, by the processor, a memory in the IC chip from the cold boot attack according to a detection result.

In monitoring the pieces of status data of the IC chip, the monitoring unit may monitor at least one of power consumption, current consumption, voltage changes, and system performance changes of the IC chip.

In detecting the cold boot attack, the processor may compare each pattern of the pieces of status data with a setting pattern set for each pattern to extract similarity and may detect the cold boot attack according to the similarity.

In detecting the cold boot attack, if the similarity of at least one of the pieces of status data is greater than or equal to a preset reference value, the processor may determine that the cold boot attack has been made.

In detecting the cold boot attack, the processor may compare the status data with a critical range set for each piece of status data to detect the cold boot attack according to a comparison result.

In detecting the cold boot attack, if at least one of the pieces of status data is out of the critical range, the processor may determine that the cold boot attack has been made.

In protecting the memory of the IC chip, if the cold boot attack is detected, the processor may increase a temperature of the IC chip.

In protecting the memory of the IC chip, the processor may overclock the IC chip.

In protecting the memory of the IC chip, if the cold boot attack is detected, the processor may protect data of the memory in the IC chip.

In protecting the memory of the IC chip, the processor may replace the data of the memory in the IC chip with null data.

DESCRIPTION OF THE DRAWINGS

Features will become apparent to those of skill in the art by describing in detail exemplary embodiments with reference to the attached drawings in which:

FIG. 3 is an exemplary diagram of pieces of status data according to one or more embodiments;

FIG. 4 is a diagram illustrating a result of analyzing the pieces of status data according to one or more embodiments;

DETAILED DESCRIPTION

Figure 1:
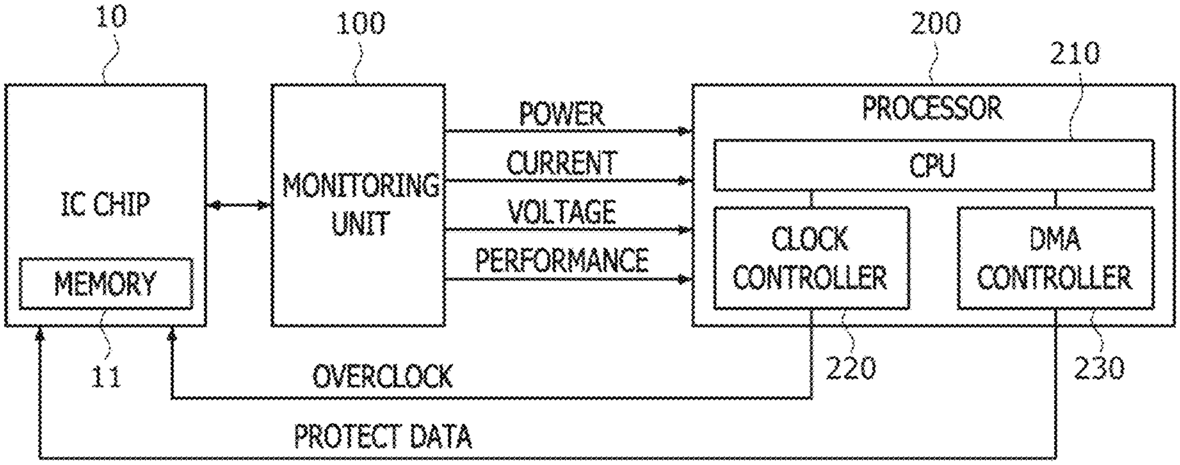
FIG. 1 is a block diagram of an apparatus for protecting a memory according to one or more embodiments.

Hereinafter, embodiments of the present disclosure will be described, in detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain his/her invention in the best way.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

The embodiments described in this specification and the configurations shown in the drawings are only some of the embodiments of the present disclosure and do not represent all of the technical ideas, aspects, and features of the present disclosure.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, the same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

When an arbitrary element is referred to as being disposed (or located or positioned) on the "above (or below)" or "on (or under)" a component, it may mean that the arbitrary element is placed in contact with the upper (or lower) surface of the component and may also mean that another component may be interposed between the component and any arbitrary element disposed (or located or positioned) on (or under) the component.

In addition, it will be understood that when an element is referred to as being "coupled," "linked" or "connected" to another element, the elements may be directly "coupled," "linked" or "connected" to each other, or an intervening element may be present therebetween, through which the element may be "coupled," "linked" or "connected" to another element. In addition, when a part is referred to as being "electrically coupled" to another part, the part can be directly connected to another part or an intervening part may be present therebetween such that the part and another part are indirectly connected to each other.

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

FIG. 1 is a block diagram of an apparatus for protecting a memory according to one or more embodiments.

Referring to FIG. 1, the apparatus for protecting a memory may include a monitoring unit 100 and a processor 200.

The monitoring unit 100 may monitor pieces of status data of an integrated circuit (IC) chip 10.

The pieces of status data may be data related to a temperature change of the IC chip 10 due to a cold boot attack. The status data may include power consumption, current consumption, voltage changes, and system performance changes of the IC chip 10. This will be described below.

The IC chip 10 may be provided as various types of IC chips 10 mounted on a variety of hardware such as a computer, a portable terminal, or a system. The type of the IC chip 10 or hardware in which the IC chip 10 is mounted may take various forms.

If a temperature of the IC chip 10 decreases due to a cold boot attack, symptoms, in embodiments, may include a change in material properties, a timing error, physical damage, and data loss may occur in the IC chip 10.

The characteristics of semiconductor devices may change under low temperature conditions. Under low temperature conditions, characteristics such as power consumption, current consumption, and voltage changes may become unstable, which may affect central processing unit (CPU) performance.

The operation of digital circuits is very sensitive to a precise timing. A timing error may occur if a temperature changes abruptly or a propagation delay time of a circuit changes. Such a timing error may reduce a calculation ability of a CPU or may cause incorrect calculation results.

Semiconductor elements are designed to operate normally only within a specific temperature range. Therefore, when a CPU cools abruptly, physical damage may occur to the semiconductor element. This may cause performance degradation or complete failure of the CPU.

When a memory in the CPU cools abruptly, data in the memory may be lost or altered. This may result in losing data a user is working on.

Accordingly, the monitoring unit 100 may, in one or more embodiments, monitor power consumption, current consumption, voltage changes, and system performance changes of the IC chip 10 using a machine learning model.

The processor 200 may analyze the pieces of status data monitored by the monitoring unit 100 through a machine learning model to detect a cold boot attack on the IC chip 10 and may protect a memory of the IC chip 10 from the cold boot attack according to a detection result.

The processor 200 may include a control unit 210, a clock controller 220, and a direct memory access (DMA) controller 230.

The control unit 210 may detect a cold boot attack on the IC chip 10 by analyzing the status data monitored by the monitoring unit 100 through a machine learning model.

Figure 2:
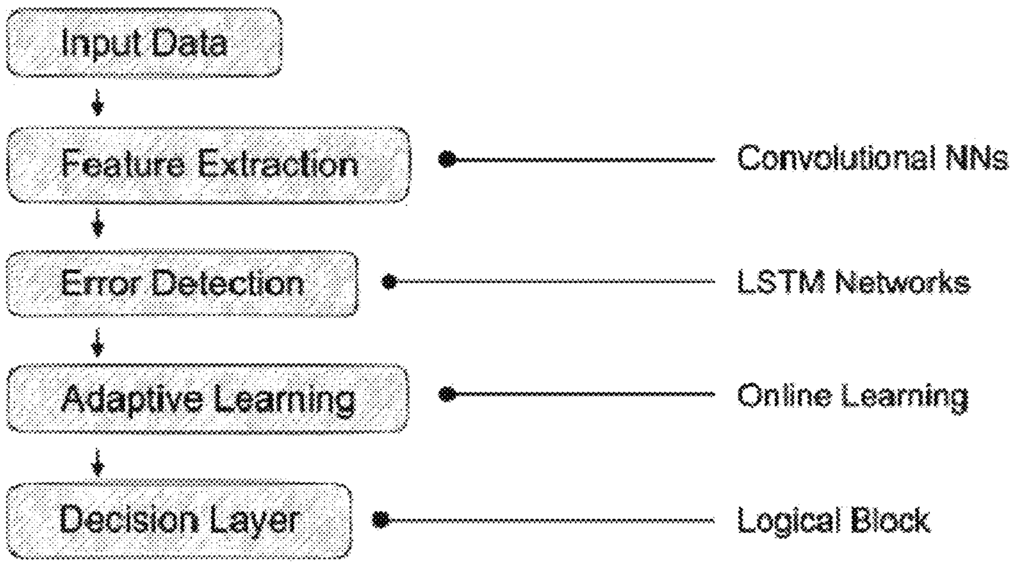
FIG. 2 is a diagram illustrating a structure of a machine learning model according to one or more embodiments.

FIG. 2 is a diagram illustrating a structure of a machine learning model according to one or more embodiments.

Referring to FIG. 2, convolutional neural networks (convolutional NNs) may receive the above-described power consumption, current consumption, voltage changes, and system performance changes as input data to extract patterns from the input data.

A long short-term memory (LSTM) network may detect errors from the input data.

A change in CPU characteristics over time may be learned through machine learning.

A logical block may determine the possibility of a cold boot attack by combining information obtained through the machine learning process.

In embodiments, the control unit 210 may receive pieces of status data monitored by the monitoring unit 100.

The control unit 210 may detect a cold boot attack by analyzing the pieces of status data through the above-described machine learning model.

FIG. 3 is an exemplary diagram of pieces of status data according to one or more embodiments.

Referring to FIG. 3, various pieces of status data, power consumption, current consumption, voltage changes, and system performance changes of the IC chip 10 are shown. The system performance changes may include timing errors, physical damage, and data errors.

The control unit 210 may detect a cold boot attack based on the power consumption, the current consumption, the voltage change, and the system performance change of the IC chip 10 through a machine learning model.

The control unit 210 may compare each piece of status data with a critical range preset for each piece of status data to detect a cold boot attack according to a comparison result.

A critical range for detecting a cold boot attack may be set for each of the power consumption, current consumption, voltage change, and system performance change of the IC chip 10. In one or more embodiments, power consumption critical range, a current consumption critical range, a voltage change critical range, and a system performance change critical range may be set.

The control unit 210 may detect a cold boot attack according to a comparison result obtained by comparing at least one of the power consumption, the current consumption, the voltage change, and the system performance change with the critical range preset for each of the power consumption, the current consumption, the voltage change, and the system performance change.

In embodiments, if an amount of the power consumption of the IC chip 10 is out of the power consumption critical range, an amount of the current consumption is out of the current consumption critical range, an amount of the voltage change is out of the voltage change critical range, or an amount of the system performance change is out of the system performance change critical range, the control unit 210 may determine that a cold boot attack has been made.

In addition, the control unit 210 may compare each pattern of status data with a setting pattern set for each pattern to extract similarity and may detect a cold boot attack based on the similarity.

In embodiments, a pattern for detecting a cold boot attack may be set for each of the power consumption, the current consumption, the voltage change, and the system performance change. In an example embodiment, a power consumption setting pattern, a current consumption setting pattern, a voltage change setting pattern, and a system performance change setting pattern may be set.

The control unit 210 may extract a power consumption pattern, a current consumption pattern, a voltage change pattern, and a system performance change pattern.

The control unit 210 may extract respective similarities by respectively comparing the power consumption pattern, the current consumption pattern, the voltage change pattern, and the system performance change pattern with the power consumption setting pattern, the current consumption setting pattern, the voltage change setting pattern, and the system performance change setting pattern.

In an example embodiment, if the similarity between the power consumption pattern and the power consumption setting pattern is greater than or equal to a preset reference value, the pattern similarity between the current consumption pattern and the current consumption setting pattern is greater than or equal to a reference value, the similarity between the voltage change pattern and the voltage change setting pattern is greater than or equal to a reference value, or the similarity between the system performance change pattern and the system performance change setting pattern is greater than or equal to a reference value, the control unit 210 may determine that a cold boot attack has been made.

In embodiments, the reference value may be a preset similarity for detecting a cold boot attack. The reference values may be set identically or differently for the power consumption pattern, the current consumption pattern, the voltage consumption pattern, and the system performance change pattern.

FIG. 4 is a diagram illustrating a result of analyzing pieces of status data according to one or more embodiments.

Referring to FIG. 4, as the result of analyzing the pieces of status data, a time at which a problem has been detected, a type of the detected problem, a severity of the problem, additional information, a power pattern, a current pattern, a voltage pattern, whether a timing error has been detected, whether physical damage has been detected, and whether a data error has been detected are shown.

If a cold boot attack is detected, the control unit 210 may control the clock controller 220 and the DMA controller 230 to protect the memory of the IC chip 10 from the cold boot attack.

The clock controller 220 may overclock the IC chip 10 according to a control signal of the control unit 210 to temporarily increase a clock speed of the IC chip 10, thereby causing a temperature of the IC chip 10 to abruptly increase.

The DMA controller 230 may execute a predefined memory copy algorithm according to a control signal of the control unit 210 to instantaneously copy null data into data of a memory area in the IC chip 10, thereby protecting data stored in the memory.

In the present example embodiment, to facilitate understanding thereof, the control unit 210, the clock controller 220 and the DMA controller 230 are described as separate components in the processor 200. However, in other embodiments, the processor 200 may be configured to integrate one or more of them as respective sub-components.

In the present example embodiment, the processor 200 may be a device that diagnoses a battery system (BAT), may be implemented, in some embodiments, as a CPU or a system-on-chip (SoC), may control multiple hardware and/or software components connected to the processor 200 by running an operating system or application, and may perform processing and calculating on various types of data. The processor 200 may be configured to execute at least one instruction stored in the memory and store execution result data in the memory.

Figure 5:
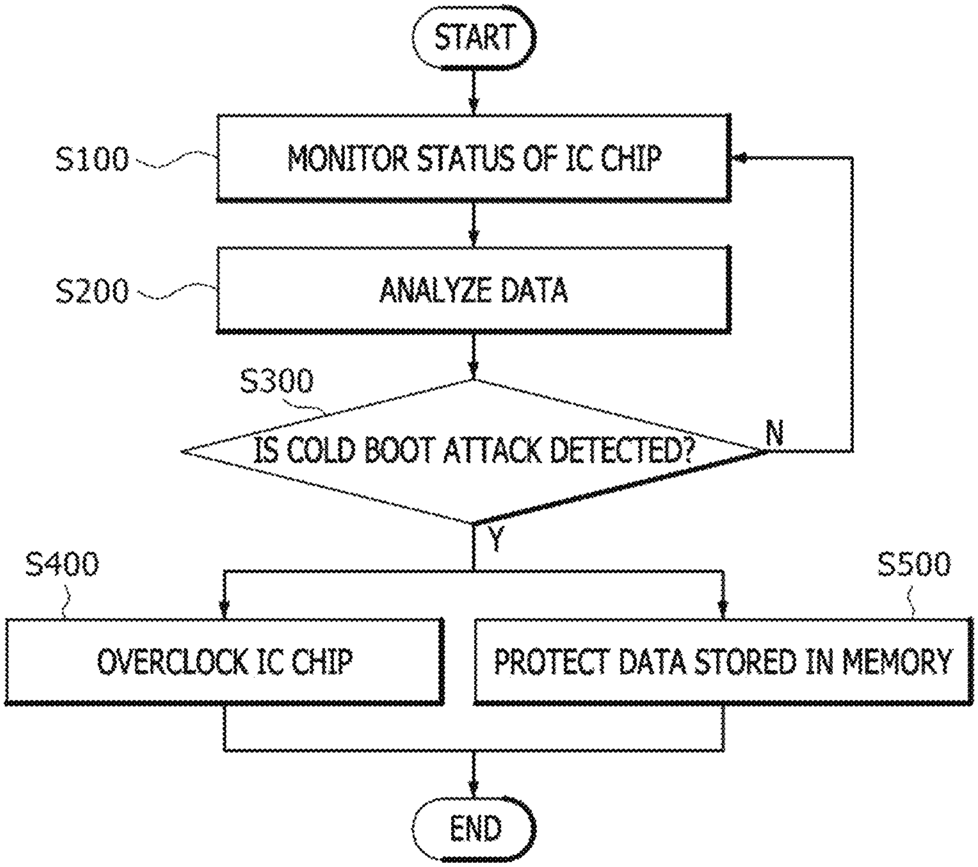
FIG. 5 is a flowchart of a method of protecting a memory according to one or more more embodiments.

FIG. 5 is a flowchart of the method of protecting a memory according to one or more embodiments.

Referring to FIG. 5, the monitoring unit 100 may monitor pieces of status data of the IC chip 10 related to a temperature change of the IC chip 10 due to a cold boot attack.

In this example embodiment, the monitoring unit 100 may monitor power consumption, current consumption, voltage changes, and system performance changes of the IC chip 10 using a machine learning model (S100).

The control unit 210 may detect the cold boot attack by analyzing the pieces of status data monitored by the monitoring unit 100, in this example embodiment, the power consumption, the current consumption, the voltage changes, and the system performance changes of the IC chip 10 (S200 and S300).

In this example embodiment, the control unit 210 may compare each piece of status data with a critical range preset for each piece of status data to detect the cold boot attack according to a comparison result. In embodiments, if the power consumption of the IC chip 10 is out of a power consumption critical range, the current consumption is out of a current consumption critical range, the voltage change is out of a voltage change critical range, or the system performance change is out of a system performance change critical range, the control unit 210 may determine that the cold boot attack has been made.

In one or more embodiments, the control unit 210 may compare each pattern of the status data with a setting pattern set for each pattern to extract pattern similarity and may detect the cold boot attack. In an example embodiment, if the similarity between a power consumption pattern and a power consumption setting pattern is greater than or equal to a preset reference value, the pattern similarity between a current consumption pattern and a current consumption setting pattern is greater than or equal to a reference value, the similarity between a voltage change pattern and a voltage change setting pattern is greater than or equal to a reference value, or the similarity between a system performance change pattern and a system performance change setting pattern is greater than or equal to a reference value, the control unit 210 may determine that the cold boot attack has been made.

In embodiments, the control unit 210 may overclock the IC chip 10 through the clock controller 220 (S400) to abruptly increase a temperature of the IC chip 10.

In embodiments, the control unit 210 may instantaneously, form a human perspective, copy null data into data of a memory area inside the IC chip 10 to protect data stored in the memory (S500).

Figure 6:
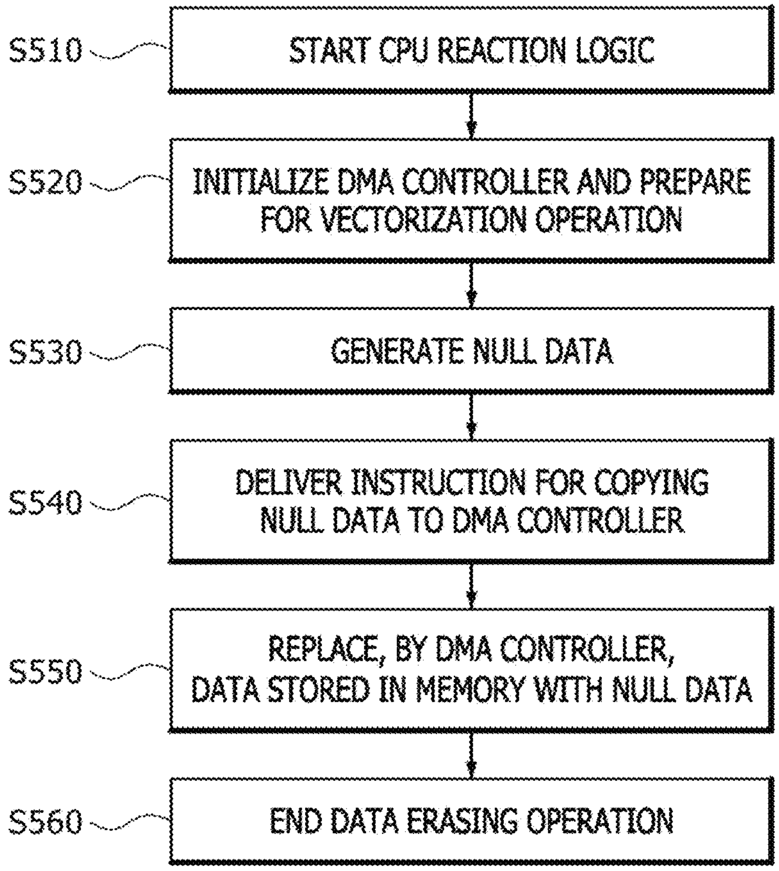
FIG. 6 is a flowchart illustrating the data protecting method of FIG. 5.

FIG. 6 is a flowchart illustrating a data protecting process of FIG. 5 (S500) according to one or more embodiments.

Referring to FIG. 6, first, the control unit 210 may detect that a bit value of a special register reserved for a cold boot attack reaction only is set to 1 and starts a reaction logic (S510).

The control unit 210 may initialize the DMA controller 230 and may prepare for a vectorization operation (S520).

The control unit 210 may generate null data (S530). The null data is data to be copied to the memory of the IC chip 10.

The control unit 210 may transmit an instruction for copying the null data into the memory of the IC chip 10 to the DMA controller 230 (S540). In an example embodiment, the vectorization operation may be used.

The DMA controller 230 may quickly replace data stored in the memory of the IC chip 10 with the null data (S550).

The DMA controller 230 may end a data erasing operation when the data of the IC chip 10 is replaced with the null data (S560).

As used herein, the term "unit or module" may include a unit implemented in hardware, software, or firmware, and may interchangeably be used with other terms, for example, logic, logic block, part, or circuitry. A unit or a module may be a single integral component, or a minimum unit or part thereof, adapted to perform one or more functions. According to one or more embodiments, a "unit or a module" may be implemented in a form of an application-specific integrated circuit (ASIC).

In this way, according to an apparatus and method for protecting a memory according to an embodiment, a memory and data can be safely protected from cold boot attacks.

In addition, an apparatus and method for protecting a memory according to one or more embodiments can ensure effective attack defense while maintaining a safe operating range of an IC chip.

Embodiments described herein may be implemented in, for example, a method or process, an apparatus, a software program, a data stream, or a signal. Although discussed only in the context of a single form of implementation (e.g., discussed only as a method), implementations of the discussed features may also be implemented in other forms (for example, an apparatus or a program). The apparatus may be implemented in suitable hardware, software, firmware, and the like. A method may be implemented in an apparatus such as a processor, which is generally a computer, a microprocessor, an integrated circuit, a processing device including a programmable logic device, or the like. Processors also include communication devices such as a computer, a cell phone, a portable/personal digital assistant ("PDA"), and other devices that facilitate communication of information between end-users.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for protecting a memory, the apparatus comprising: a monitoring unit configured to monitor pieces of status data of an integrated circuit (IC) chip; and a processor configured to analyze the status data monitored by the monitoring unit to detect a cold boot attack on the IC chip and protect a memory in the IC chip from the cold boot attack according to a detection result, wherein the processor is configured to overclock the IC chip to raise a temperature of the IC chip in response to detecting the cold boot attack, wherein the monitoring unit monitors system performance changes including timing errors of the IC chip, and wherein the processor compares each of a plurality of patterns of the status data with a setting pattern set for each of the plurality of patterns to extract similarities and detect the cold boot attack according to the similarities.

2. The apparatus as claimed in claim 1, wherein the monitoring unit further monitors at least one of power consumption, current consumption, and voltage changes of the IC chip.

3. The apparatus as claimed in claim 1, wherein, if the similarities of at least one of the pieces of status data is greater than or equal to a preset reference value, the processor determines that the cold boot attack has been made.

4. The apparatus as claimed in claim 1, wherein the processor compares the status data with a critical range preset for each piece of status data to detect the cold boot attack according to a comparison result.

5. The apparatus as claimed in claim 4, wherein, if at least one of the pieces of status data is out of the critical range, the processor determines that the cold boot attack has been made.

6. The apparatus as claimed in claim 1, wherein, if the cold boot attach is detected, the processor protects data of the memory in the IC chip.

7. The apparatus as claimed in claim 6, wherein the processor replaces the data of the memory in the IC chip with null data.

8. A method for protecting a memory, the method comprising: monitoring, by a monitoring unit, pieces of status data of an integrated circuit (IC) chip; analyzing, by a processor, the pieces of status data monitored by the monitoring unit to detect a cold boot attack on the IC chip; and protecting, by the processor, a memory in the IC chip from the cold boot attack according to a detection result, wherein protecting the memory in the IC chip includes overclocking, by the processor, the IC chip to increase a temperature of the IC chip in response to detecting the cold boot attack, wherein monitoring of the pieces of status data of the IC chip includes the monitoring unit monitoring system performance changes including timing errors of the IC chip, and wherein detecting of the cold boot attack includes the processor comparing each of the plurality of patterns of the pieces of status data with a setting pattern set for each of the plurality of patterns to extract similarities and detect the cold boot attach according to the similarities.

9. The method as claimed in claim 8, wherein monitoring of the pieces of status data of the IC chip includes the monitoring unit further monitoring at least one of power consumption, current consumption, and voltage changes of the IC chip.

10. The method as claimed in claim 8, wherein detecting of the cold boot attack includes the similarities of at least one of the pieces of status data being greater than or equal to a preset reference value and the processor determining that the cold boot attack has been made.

11. The method as claimed in claim 8, wherein detecting of the cold boot attack includes the processor comparing the status data with a critical range set for each piece of status data to detect the cold boot attack according to a comparison result.

12. The method as claimed in claim 11, wherein detecting of the cold boot attack includes at least one of the pieces of status data being out of the critical range and the processor determining that the cold boot attack has been made.

13. The method as claimed in claim 8, wherein protecting of the memory of the IC chip includes the cold boot attack being detected and the processor protecting data of the memory in the IC chip.

14. The method as claimed in claim 13, wherein protecting of the memory of the IC chip includes the processor replacing the data of the memory in the IC chip with null data.

* * * * *